Aug. 7, 1956  K. L. SHRIDER ET AL  2,758,251
RECTIFIER SYSTEM
Filed June 1, 1953  2 Sheets-Sheet 2

INVENTORS,
KENNETH L. SHRIDER
ANDREW J. HUMPHREY

United States Patent Office 2,758,251
Patented Aug. 7, 1956

2,758,251
RECTIFIER SYSTEM

Kenneth L. Shrider and Andrew J. Humphrey, Cleveland, Ohio, assignors to The Reliance Electric & Engineering Company, a corporation of Ohio Application June 1, 1953, Serial No. 360,492

7 Claims. (Cl. 315—146)

The invention relates in general to multi-phase rectifier systems and more particularly to rectifiers operable from a plurality of phases in a double-way or full-wave bridge rectification system wherein two pulses or peaks of voltage are applied to each grid of the rectifiers to cause them to conduct current with the pulses being spaced apart sixty degrees for a six tube, three phase rectifier system.

The prior art rectifier systems have utilized six tubes in a so-called six phase, double-way rectifier system operable from a three terminal, three phase energization source to produce six current pulses to the load per cycle. When these are used with mercury arc rectifiers or similar ionizable gas tubes, the grids of the tubes have been triggered to establish firing of the tubes with the grid voltage being a sinusoidal voltage. The sinusoidal voltage has a positive half wave one hundred eighty degrees long wihch will permit firing of a tube in the rectifier system at two different points sixty degrees apart during periods of discontinuous conduction of the tubes such as at very low power output values.

The present application utilizes a circuit which considerably reduces the likelihood of forward failures. By forward failure is meant a premature firing of a rectifier tube which sends a pulse of current to the load which is in excess of that established by the normal setting of the control circuit for the rectifier. In any bridge or double-way rectifier circuit two tubes must conduct in series to supply load current. The circuit of the present invention conditions all tubes so that there is a considerably reduced chance for two tubes serially connected with the load to be fired at improper instants.

An object of the invention is to establish a six phase, double-way rectifier system energized from a three phase source wherein the danger of forward failures is considerably reduced.

Another object of the invention is to provide a full-wave rectifier system for mercury arc rectifiers using pulses of voltages on the grids to provide precise output voltage control.

Another object of the invention is to provide a full-wave energy translation system between alternating current and direct current circuits wherein the mercury arc devices are triggered by voltage pulses having a phase angle therebetween equal to sixty degrees for a system containing six mercury arc devices, which in effect is to use pulses having a phase angle therebetween equal to 360° divided by the number of mercury arc devices, for A. C. circuits of three or more phases.

Another object of the invention is to provide a mercury arc rectifier system having peaks of grid current of value sufficient to fire the mercury arc rectifiers and having valleys in between the peaks of a value insufficient to do so.

Another object of the invention is to provide a six phase, full-wave rectifier system operable from a three phase source and having six output current pulses per cycle wherein the rectifiers are triggered sequentially by pulses, with rectifiers on the same side of the double-way bridge having peaks applied thereto that are one hundred twenty electrical degrees apart and rectifiers opposite each other having peaks applied thereto one hundred eighty electrical degrees apart.

Another object of the invention is to provide a three phase rectifier system operable from a single phase bridge circuit with phase splitters to shift the phase plus sixty degrees and minus sixty degrees with voltage inversion to provide a three phase current triggering voltage supply system.

Another object of the invention is to provide a three phase rectifier system having a single phase bridge circuit supplying three separate phase splitters with two of said phase splitters being adjustable to trim the phase relationship thereof relative to the third one as a reference.

Another object of the invention is to provide a grid control system for a polyphase rectifier from a phase shifting device operable from single phase.

Another object of the invention is to provide a grid control system and controlling mercury arc rectifier tubes wherein only a small total power input to the control circuit is required.

Another object of the invention is to provide a grid control circuit utilizing voltage pulses applied between the cathode and grid and utilizing current transformers wherein the pulses are applied to serially connected rectifier tubes and the circuit is arranged such that when one tube fires it helps to establish an even larger grid voltage on the other tube to make certain that it will fire instantaneously thereafter.

Another object of the invention is to provide a grid control circuit for mercury arc rectifiers wherein a three phase grid circuit is obtained from single phase and wherein the input to the three phase phase shifter remains constant in amplitude and symmetrical in wave shape for all phase shift angles.

Other objects and a fuller understanding of this invention may be had by referring to the following description and claims, taken in conjunction with the accompanying drawing, in which:

Figure 1:
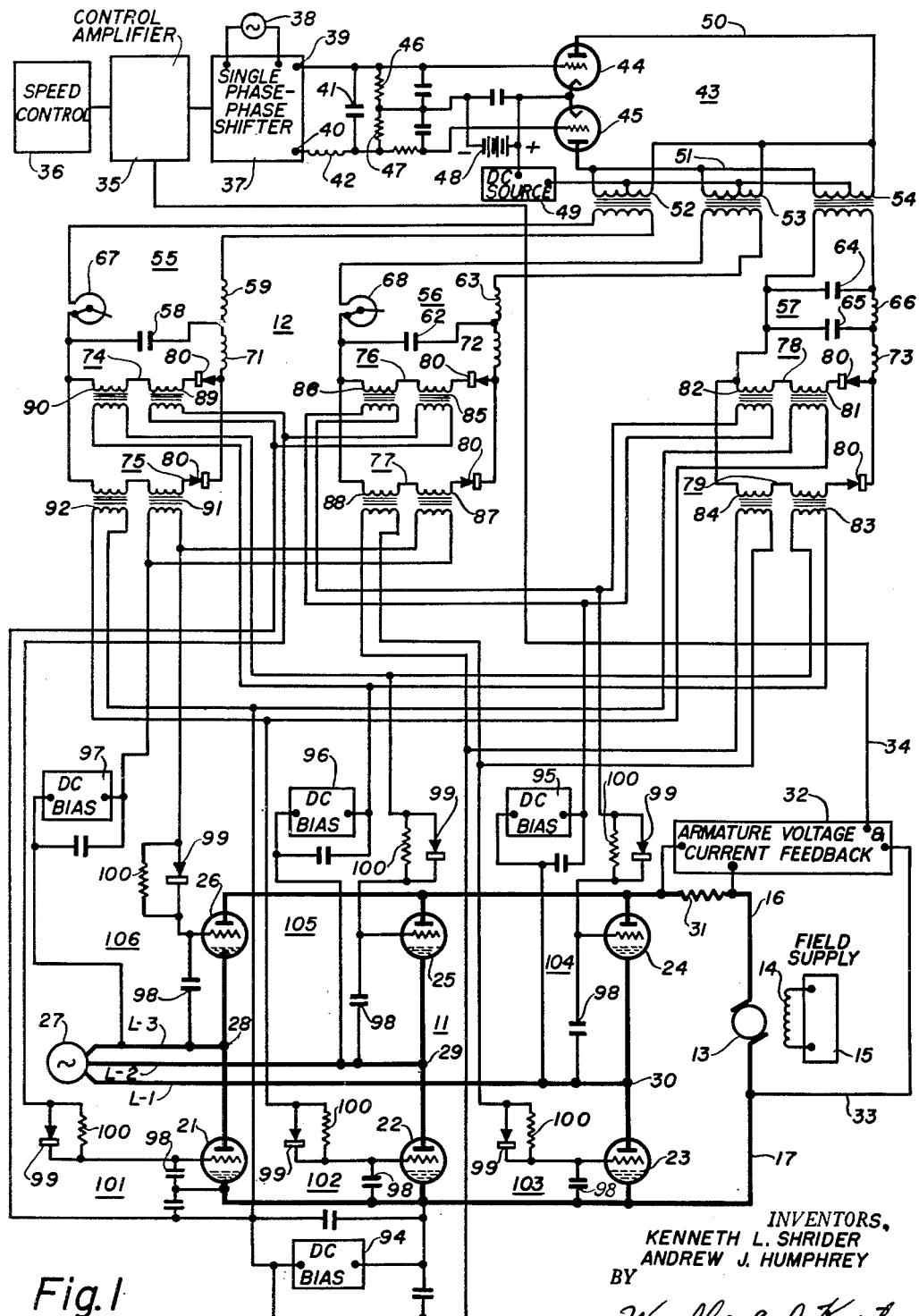
Figure 1 is a schematic diagram of a complete rectifier system and grid control circuit.

The Figure 1 shows a schematic diagram of a rectifier system 11 controlled by a grid control circuit 12 and supplying rectified current to a load which in this case is shown as a direct current motor armature 13. The motor which has armature 13 has a field winding 14 supplied by a separate field supply 15. The armature 13 is connected to a first bus 16 and a second bus 17.

The rectifier system 11 includes generally first through sixth rectifiers 21 through 26, respectively. These rectifiers contain an ionizable fluid medium, and in this case are shown as mercury arc excitrons. Each of the tubes has a mercury pool cathode, an anode, and a grid. The anodes of the rectifiers 24, 25, and 26 are all connected together and connected to the bus 16. The cathodes of the rectifiers 21, 22, and 23 are connected together and connected to the bus 17. A three phase source is indicated at 27 and has source terminals 28, 29, and 30. The anodes of the rectifiers 21, 22, and 23 are connected respectively to the source terminals 28, 29, and 30 and connected respectively to the cathodes of the rectifiers 26, 25, and 24. The six rectifiers 21 through 26 are connected in a six phase, double-way rectifier circuit between the three phase source 27 and the load 13.

The grid control circuit 12 is partly indicated by a block diagram and partly by a schematic diagram showing the individual components. A current indicating impedance 31 is connected serially in the bus 16. An armature voltage and current feed back circuit 32 is connected across this impedance 31 and is also connected across the armature 13 by a connection 33. The single line 34 indicates that the circuit 32 is connected to a control amplifier circuit 35. A speed control circuit 36 is connected to the control amplifier circuit to manually or automatically control the speed of the motor armature 13. The control amplifier circuit 35 in turn is connected to a phase shift circuit 37 which is operable from a single phase source 38. This single phase source may be a part of the three phase source 27 or in some manner is synchronized with it. The output of the phase shift circuit 37 appears across terminals 39 and 40. The terminals 39 and 40 deliver approximately one hundred volts in this case. Thus, the voltage output is connected across a condenser 41 and an inductance 42 which comprise a harmonic filter. This harmonic filter is not resonant to the line frequency, but it does attenuate to a high extent the harmonics which may be present in the output of the phase shift circuit 37. The phase shift circuit 37 may be of a low power output type which cannot be loaded appreciably. Because of the harmonic filter 41—42, the voltage across the condenser 41 is quite free from harmonics and symmetrical in wave shape.

A power amplifier 43 is used to amplify the power level of the phase shiftable voltage across condenser 41. This power amplifier 43 includes amplifier tubes 44 and 45 connected in push-pull. To accomplish an input to the tubes 44 and 45, the voltage across the condenser 41 is center tapped by resistors 46 and 47. A direct current source 48 is provided for grid bias, and a second direct current source 49 is provided for plate supply. The push-pull output of the power amplifier 43 occurs across the lines 50 and 51. The grids of the amplifier tubes 44 and 45 are overdriven so that the output wave form on the lines 50 and 51 remains substantially constant in wave shape and amplitude when phase shifted. Power transformers 52, 53, and 54 each have primaries which are connected in parallel to the lines 50 and 51. These primaries are center tapped for connection to the direct current source 49. The secondaries of the power transformers 52, 53, and 54 supply phase splitters 55, 56, and 57. These phase splitters are used to shift the phase of the voltage so that three different voltages 120 degrees apart in phase may be obtained from the single phase source 38 with each of these three voltages remaining symmetrically equidistant as all three voltages are shifted in phase by phase shift circuit 37. The phase splitter 57 may be considered to have zero phase for a reference, the phase splitter 55 produces a uniform phase shift of minus sixty degrees, and the phase splitter 56 produces a uniform phase shift of minus one hundred twenty degrees which also may be considered as plus sixty degrees. The phase splitter 55 has a condenser 58 and linear inductance 59 to accomplish the fixed phase shift. Similarly, the phase splitter 56 has a condenser 62 and linear inductance 63, and the phase splitter 57 has condensers 64 and 65 and linear inductance 66 to accomplish this fixed phase shift. The phase splitters 55 and 56 have potentiometers 67 and 68, respectively, to trim the phase shift of these phase splitters relative to the phase splitter 57. This assures that the two phase splitters 55 and 57 have output voltages which are sixty degrees plus and minus of the voltage of the phase splitter 56.

Each of the phase splitters has two discharge circuits connected in parallel. The paralleled discharge circuits are connected in series with a saturable reactance with this series combination connected across the output condenser. The phase splitter 55 has a saturable reactance 71 and discharge circuits 74 and 75. The phase splitter 56 has a saturable reactance 72 and discharge circuits 76 and 77. The phase splitter 57 has a saturable reactance 73 and discharge circuits 78 and 79. Each of the discharge circuits includes a pulse rectifier 80. These pulse rectifiers are connected in opposition relative to the saturable reactance to which they are connected in series. The discharge circuits include twelve current transformers, two for each of the rectifiers 21 through 26. These current transformers have been designated by the reference characters 81 through 92, respectively. The primaries of each of these current transformers are connected in the discharge circuits 74 through 79. Two primaries are serially connected in each of the discharge circuits, for example, the primaries of current transformers 81 and 82 are serially connected in the discharge circuit 78.

The pulsing arrangement is achieved by charging the condensers 58, 62, and 65 from the secondaries of the power transformers through the linear inductances 59, 63, and 66. The saturable reactances 71, 72, and 73 were of the saturating type which has a rectangular hysteresis loop. The impedance of the saturable reactance changes abruptly at a given voltage level and discharges the energy of the condenser through the current transformer primary. Because of the high turns ratio of the secondary relative to the primary, the secondary then displays a high peak voltage. The linear inductances 59, 63, and 66 prevent dissipation of the discharge condenser current and instead cause this discharging condenser current to flow through the current transformers. The secondaries of the current transformers 81 through 92 are connected in the grid circuits 101 through 106 of the rectifier tubes 21 through 26, respectively.

The grid circuits 101, 102, and 103 have a common direct current bias source 94. Individual direct current bias sources 95, 96, and 97 are provided for the grid circuits 104, 105, and 106 inasmuch as there is no common cathode for the associated rectifiers 24, 25, and 26. The customary high frequency by-pass condenser 98 is provided between grid and cathode of each of the rectifiers 21 through 26. Two secondaries of the current transformers 81 through 92 are connected in parallel in each of the grid circuits 101 through 106. These paralleled current transformer secondaries are connected in series with the associated direct current bias source and a negative peak rectifier 99. Paralleled across each of the negative peak rectifiers 99 is a high resistance 100. The current transformer primaries, the secondaries of which are paralleled in each of the grid circuits 101 through 106, are connected in the outputs of different phase splitters. The current transformer secondaries connected in the grid circuit 101, for example, are the secondaries of the current transformers 85 and 89 which are in the ouputs of the phase splitters 56 and 55, respectively.

*Operation*

Figure 2:
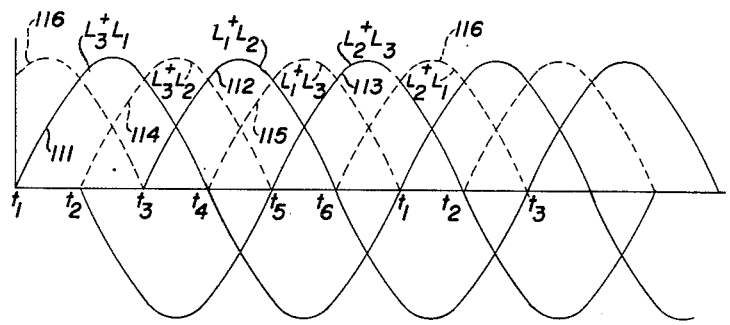
Figure 2 is a diagram of the three phase voltages.
Figure 3:
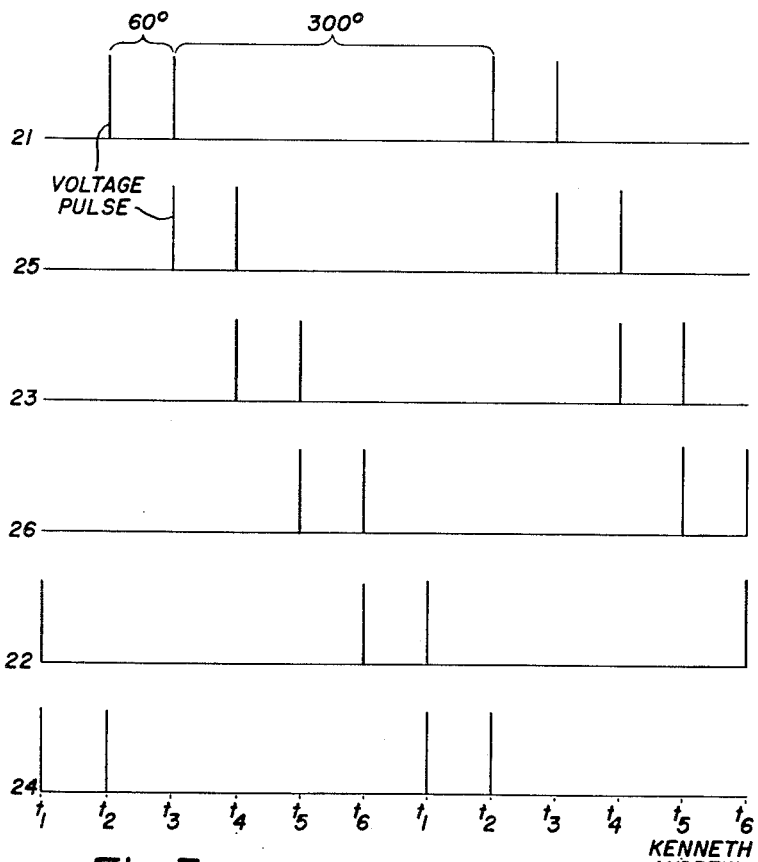
Figure 3 is a diagram of the grid pulse voltages.

The Figures 2 and 3 help explain the operation of the circuit of Figure 1. Figure 2 shows three phase voltages with any arbitrary sequence of phase rotation. On the Figure 1 the lines 1, 2, and 3 are those connected to the source terminals 30, 29, and 28, respectively. Curve 111 shows a graph of a voltage wherein line 3 is positive of line 1. Curve 112 shows a graph of voltage wherein line 1 is positive of line 2, and curve 113 shows a graph of voltage wherein line 2 is positive of line 3. The dotted curve 114 is the inverse of the negative portion of curve 113; and hence, may be considered as the graph of the voltage wherein line 3 is positive of line 2. Similarly, dotted curves 115 and 116 show the graphs of voltages wherein line 1 is positive of line 3 and wherein line 2 is positive of line 1. The overlapping portions of the curves 114 and 112 thus have in common the fact that $L_2$ may be considered the axis or base line since these curves represent times when either line 3 or line 1 is positive relative to line 2. Every sixty degrees on the base line has been indicated by a time $t_1$ through $t_6$. From interval time $t_2$ to $t_5$ rectifiers 21 and 25 may conduct serially if the grids thereof are triggered. This is a one hundred eighty degree period wherein the anode of rectifier 21 is positive of the cathode of rectifier 25. Similarly, between times $t_3$ and $t_6$ rectifiers 23 and 25 may conduct serially if the grids thereof are triggered. Actually, in full conduction with this form of bridge circuit or six phase, double-way rectifier system, there are six pulses of current delivered to the load 13. Each pulse lasts for sixty degrees and is delivered through two rectifiers in series. In the interval between times $t_2$ and $t_3$ when line 3 is most positive to line 1, rectifiers 21 and 24 are triggered by their grids so as to serially conduct current to the load 13. In the interval between times $t_3$ and $t_4$ the rectifiers 21 and 25 will serially conduct current to the load. It is noted that rectifier 21 thus, under full conduction conditions, carries current for one hundred twenty degrees; and this is commutated between rectifiers 24 and 25 for sixty degrees each. Next, from interval $t_4$ to $t_5$ when the line 1 is positive to line 2, rectifiers 23 and 25 serially conduct current to the load. Thus, the load current is commutated from rectifier 21 to rectifier 23. The current continues to be commutated from tube to tube in sequence throughout the three hundred sixty degree cycle.

The grid control circuit 12 is arranged to provide the proper triggering of the mercury arc rectifiers 21 through 26 to achieve this sequential conduction of load current. The rectifiers 21 through 26 are triggered in the sequence 21—25—23—26—22—24, for the particular phase rotation chosen.

The Figure 3 shows the arrangement of the pulses applied to the rectifier tubes 21 through 26 in the order previously mentioned. Each rectifier tube has applied to the grids thereof two pulses of voltage which are sixty degrees apart for each three hundred sixty degree cycle. This means that there is a sixty degree interval between the leading and lagging pulse, and a three hundred degree interval between the lagging and leading pulse. Furthermore, the lagging pulse applied to a particular rectifier is coincident with the leading pulse applied to the subsequent rectifier. The fact that these pulses are coincident assures that two tubes will be fired in series to conduct current to the load. It will be observed that pulses for rectifiers on the same side of the double-way bridge are one hundred twenty electrical degrees apart while rectifiers opposite each other have pulses one hundred eighty electrical degrees apart. These pulses are sufficient in amplitude to fire the mercury arc excitrons. The bias sources 94 through 97 provide a negative bias sufficient to prevent rectifiers from firing between pulses.

The phase shift circuit 37 is controlled by the speed control circuit 36 or the armature voltage and current feed back circuit 32 on a combination thereof so that a phase shiftable voltage on the terminals 39 and 40 will control the output from zero to full load current on the armature 13. A one hundred twenty degree phase shift is sufficient to control from zero to full load armature current. The power amplifier 43 utilizes this single phase output voltage from the phase shift circuit 37 and in push-pull supplies a power output to the power transformers 52, 53, and 54. This voltage remains constant in amplitude and wave form despite the reflected loading from the phase splitters 55, 56, and 57 because the grids of the amplifier tubes 44 and 45 are considerably overdriven. The condensers 58, 62, and 65 are charged during each alternation of the single phase voltage through the associated linear inductance. The saturable reactances 71, 72, and 73 change their impedance abruptly and discharge through the discharge circuits 74 through 79. A high peak voltage is thus instantaneously developed on the secondaries of the pulse transformers 81 through 92. Because of the opposite connection of the pulse rectifiers 80 in each of the discharge circuits, the two discharge circuits are alternately effective in discharging the opposite polarity charges on the output condensers. At time $t_3$ as shown in Figures 2 and 3, rectifiers 21 and 25 simultaneously receive a pulse on their grids to fire them.

At time $t_4$ rectifiers 23 and 25 simultaneously receive a voltage pulse on their grids to fire these tubes simultaneously. Thus, at the time $t_3$ pulses are applied to the grid circuits 101 and 105. The pulse on the grid circuit 101 comes from the secondary of the current transformer 89. The current transformer 90 also has a pulse on the secondary thereof which is applied to the grid circuit 105. At time $t_4$ the discharge circuit 79 is effective with the secondaries of the current transformers 83 and 84 having pulses thereon applied to the grid circuits 103 and 105. This fires rectifiers 23 and 25. At time $t_5$ the discharge circuit 77 is effective, and the secondaries of the current transformers 87 and 88 apply pulses to the grid circuits 103 and 106. This fires rectifiers 23 and 26. This sequence is continued throughout the three hundred sixty degree cycle. It will be noted that although the phase splitters 55, 56, and 57 provide a fixed phase shift of only sixty degrees plus or minus, because of the paralleled discharge circuits in opposition and the transformer secondaries, a total of six voltages, each sixty degrees apart in phase, is obtained.

An important feature of the invention is the fact that the secondaries of the current transformers 81 through 92 are connected in parallel whereas the primaries thereof are connected in series. At any one of the times $t_1$ to $t_6$ two rectifiers are required to be fired simultaneously. At time $t_3$, for example, rectifiers 21 and 25 are to be fired which means simultaneous pulses delivered from the current transformers 89 and 90. When one of the excitrons 21 or 25 fires, the voltage on its grid will go down because of the grid then drawing current. Since the grid draws current, this will represent a considerable load on the secondary of the associated current transformer. That current transformer reflects the lowered impedance from the secondary to the primary thereof, and since the primaries of two current transformers are connected in series, the lowered impedance of one will cause a higher voltage to appear across the primary of the other. This will help to fire the other tube. If the current transformer primaries were connected in parallel, this would have a deleterious effect, since the loading of the rectifier grid passing current will load the associated current transformer, and hence, lower the coincident pulse necessary to fire the serially connected rectifier. In the arrangement shown one rectifier helps the firing of the other.

The high frequency by-pass condensers 98 perform the regular functions of paralleling the inter-electrode capacity of the grid and cathode so that high frequency transient voltages are greatly attenuated thereby relieving the grid circuits of spurious voltages which could fire the rectifiers at improper instants. The high frequency by-pass condensers perform another circuit function in that the reflected impedance into the primary of the current transformers resonates with the minimum impedance of the saturable reactances 71, 72, and 73 thereby increasing the power of the pulses.

The pulses of grid voltage last only for micro-seconds; hence, there is only a small total power input to the grid circuits. This means that the current transformers may be quite small in physical size and yet avoid saturation on the peaks.

The entire rectifier system 11 will have a zero output when all pulses on Figure 3 are shifted to the right sufficiently so that none of the rectifiers 21 through 26 will conduct. This is accomplished by the phase shift circuit 37. If the phase of the output voltage of the phase shift circuit 37 is varied in a leading direction, all pulses shown on Figure 3 simultaneously shift to the left. When all pulses are shifted to the left thirty degrees from the off condition, each rectifier 21 through 26 will conduct for only the last thirty degrees of the corresponding cycle wherein the anode voltage is positive relative to the cathode voltage. For this thirty degree leading condition the rectifiers 21 through 26 may be in what is known as discontinuous conduction. This means that six discrete pulses of current are supplied to the load 13. For a three hundred sixty degree cycle there are six pulses, each with a thirty degree or more duration and a thirty degree or less interval between pulses depending on the characteristic of the load. For zero output load current all pulses shown on Figure 3 are shifted to the right one hundred twenty degrees relative to the time axis. For a thirty degree leading condition, the leading pulse applied to rectifier 25 now appears midway between time $t_4$ and $t_5$. Thus, rectifiers 21 and 25 serially conduct load current for thirty degrees up to the time $t_5$ for a resistive load. At this time both rectifiers go out because the line 3 is no longer positive relative to the line 2. The time at which the rectifiers go out depends upon the character of the load, such as having a reactive component or having a counted voltage, as does the motor armature 13. Thus, the time that the rectifiers 21 and 25 go out may be before or after time $t_5$. When the time mid-way between time $t_5$ and $t_6$ occurs, both rectifiers 23 and 25 must be fired by an applied grid pulse. It will thus be noted that the rectifier 25 conducted current twice in interval $t_4$ to $t_6$. This is the reason why two separate pulses sixty degrees apart must be applied to each of the rectifiers 21 through 26 so that the rectifiers can be brought through the period of discontinuous condition into the period of continuous conduction.

The high resistances 100 shunting the negative peak rectifiers 99 perform a necessary function when the rectifiers 21 through 26 are commutated. It is a natural consequence that the secondaries of the current transformers 81 through 92 exhibit not only a positive peak for firing the grids but also exhibit a negative peak which is unusable for grid firing. This is necessary since the voltage must be alternating and its value for a complete cycle must integrate to zero. The negative peak, however, when the rectifiers 21 through 26 are close to entering continuous conduction, tends to cancel the on-coming positive peak, the sixty degree lagging pulse. The result obtained is unusable for motor drive applications because the negative peak, in tending to cancel the sixty degree lagging positive peak, will wipe out this pulse so that the preceding one of the pair of serially conducting rectifiers will not refire. For example, in Figure 3 at time $t_3$ rectifiers 21 and 25 are to be triggered simultaneously. A leading pulse is applied to rectifier 25 and a sixty degree lagging pulse is applied to rectifier 21. The negative pulse corresponding to the leading peak on rectifier 21 will tend to cancel the lagging positive pulse on rectifier 21 at time $t_3$, and thus, the rectifier 21 may fail to fire. The negative peak rectifiers 99 are provided to clip these negative peaks and in doing so tend to force the high frequency by-pass condensers 98 to crest-ride. This effect cannot be tolerated since it tends to annul the negative bias of the bias sources 94 through 97 which originally maintain non-conducting conditions on the rectifiers 21 through 26. The shunting high resistances 100 dissipate this charge on the high frequency by-pass condensers 98 at a rate greater than that possible by the inverse impedance of the negative peak rectifiers 99. The value of the high resistances 100 is selected so that the full negative bias value on the rectifier grids is restored in about one hundred twenty to one hundred eighty electrical degrees following the lagging grid pulse.

The fact that twelve separate current transformers are used completely eliminates inductive coupling between the circuits generating the pulses and as a result spurious pulses on the grids are nearly completely eliminated. It will be observed that any pulses to the left of the main pulses shown on Figure 3 are quite damaging in that they would cause forward failures if of sufficiently large amplitude to trigger the rectifier.

The fact is that during conditions of non-conduction of the rectifiers 21 through 26, the direct current bias sources 94 through 97 maintain the grids of these rectifiers at a negative voltage, so that the possibility of forward failures is considerably reduced. This is not true in the prior art system of utilizing sine wave voltages on the grids of these power rectifiers. Thus, the instant circuit utilizes considerably less power and provides a much safer circuit condition.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A three phase rectifier system for supply of six phase current to a two terminal load, comprising first through sixth rectifiers having an ionizable medium, three phase alternating current supply line terminals, each of said rectifiers having an anode, a cathode, and a grid, the cathodes of said first, second, and third rectifiers being directly interconnected and connected to one terminal of said load, the anodes of said fourth, fifth, and sixth rectifiers being directly interconnected and connected to the other terminal of said load, the anodes of said first, second, and third rectifiers being connected to said three alternating current source terminals and to the cathodes of said sixth, fifth, and fourth rectifiers, respectively, bias circuit means for biasing the grids negative relative to the cathodes of each of said rectifiers, six separate pulse triggering circuits connected, respectively, between the cathode and grid of each of said rectifiers, said pulse triggering circuits including a phase shift circuit and a plurality of phase splitters connected to the output thereof, a saturable reactor and current transformer primary windings connected to the output of each of said phase splitters, and two secondaries of said current transformers connected in parallel to the grid of each of said rectifiers, said pulse triggering circuits each providing two positive voltage pulses approximately sixty degrees apart per three hundred sixty degree cycle to the respective grids to fire said corresponding rectifiers, said pairs of pulses being sequentially applied to said first, fifth, third, sixth, second, and fourth rectifiers substantially sixty degrees apart to sequentially fire said six rectifiers in that order, the first pulse applied to one rectifier grid coinciding with the last pulse applied to the preceding rectifier grid, the grids of each of said rectifiers being held at a negative potential relative to the cathode thereof between current pulses by said bias circuit means during periods of non-conduction of said rectifiers.

2. A rectifier system for variable supply of current to a load, comprising first through sixth mercury arc rectifiers, three phase alternating current supply line terminals, each of said rectifiers having an anode, a cathode, and a grid, the cathodes of said first, second, and third rectifiers being directly interconnected and connected to one terminal of said load, the anodes of said fourth, fifth, and sixth rectifiers being directly interconnected and connected to the other terminal of said load, the anodes of said first, second, and third rectifiers being connected to said three alternating current source terminals and to the cathodes of said sixth, fifth, and fourth rectifiers, respectively, bias circuits for biasing the grids of each rectifier negative relative to the cathodes, pulse triggering means connected between the cathode and grid of each of said rectifiers, said pulse triggering means including a phase shift circuit and a plurality of phase splitters connected to the output thereof, a saturable reactor and current transformer primary windings connected to the output of each of said phase splitters, and two secondaries of said current transformers connected in parallel to the grid of each of said rectifiers, said pulse triggering means providing two positive pulses of voltage approximately sixty degrees apart per three hundred sixty degree cycle to the respective grids to fire said corresponding rectifier, the first pulse applied to one rectifier grid coinciding with the last pulse applied to the preceding rectifier grid, and said bias circuits establishing valleys between said voltage pulses of a value insufficient to cause current conduction in said rectifiers during periods of non-conduction of said rectifiers to thereby prevent forward failure of said rectifiers.

3. A rectifier system for variable supply of current to a two terminal load, comprising first through sixth mercury arc excitrons, three phase alternating current supply line terminals, each of said excitrons having an anode, a cathode, and a grid, the cathodes of said first, second, and third excitrons being directly interconnected and connected to one terminal of said load, the anodes of said fourth, fifth, and sixth excitrons being directly interconnected and connected to the other terminal of said load, the anodes of said first, second, and third excitrons being connected to said three alternating current source terminals and to the cathodes of said sixth, fifth, and fourth excitrons, respectively, individual bias circuits for each of said fourth, fifth, and sixth excitrons, a common bias circuit for said first, second, and third excitrons, said bias circuits biasing the grids negative relative to the cathodes of each of said excitrons, six separate pulse triggering circuits connected, respectively, between the cathode and grid of each of said excitrons, said pulse triggering circuits including a phase shift circuit and a plurality of phase splitters connected to the output thereof, a saturable reactor and current transformer primary windings connected to the output of each of said phase splitters, and two secondaries of said current transformers connected in parallel to the grid of each of said rectifiers, said pulse triggering circuits each providing two pulses of positive voltage approximately sixty degrees apart per three hundred sixty degree cycle to the respective grids to fire said corresponding excitron, said pairs of pulses being sequentially applied to said first, fifth, third, sixth, second, and fourth excitrons substantially sixty degrees apart to sequentially fire said six excitrons in that order, the first pulse applied to one excitron grid coinciding with the last pulse applied to the preceding excitron grid, the grids of each of said excitrons being held at a negative potential relative to the cathode thereof between voltage pulses by said bias circuit during periods of non-conduction of said excitrons.

4. A voltage pulsing circuit for grid control of a full wave rectifier system having rectifiers with grid and cathode and operable from a reference voltage, said voltage pulsing circuit including a phase shift circuit connected to said reference voltage to control the phase of the output voltage thereof relative to said reference voltage, a plurality of phase splitters connected to the output of said phase shift circuit, a saturable reactor and current transformer primary windings connected to the output of each of said phase splitters, a grid circuit for each of said rectifiers, and two secondaries of said current transformers connected in parallel in each of said grid circuits.

5. A voltage pulsing circuit for grid control of a full wave rectifier system operable from a reference voltage, said voltage pulsing circuit including a phase shift circuit connected to said reference voltage to control the phase of the output voltage thereof relative to said reference alternating current voltage, a plurality of phase splitters connected to the output of said phase shift circuit, a capacitive reactance connected in the output of each of said phase splitters to be charged by the output voltages thereof, a saturable reactor and two paralleled discharge circuits connected in series across each of said capacitive reactances, each of said discharge circuits including serially connected first and second primary windings of current transformers and including a pulse rectifier, the two pulse rectifiers connected to each of the capacitive reactances being connected in opposition relative thereto, each of said rectifiers in said rectifier system having a grid and a cathode connected in a grid circuit, and two secondaries of said current transformers connected in parallel in each of said grid circuits.

6. In a grid control system for a full wave rectifier system operable from a reference three phase voltage and having six rectifiers, a voltage pulsing circuit including a generally sinusoidal voltage generator, an adjustable phase shift circuit connected to said generator to control the phase of the output voltage thereof relative to said reference voltage, first, second and third phase splitters connected to the output of said generator, said first and third phase splitters shifting the phase by sixty degrees plus and sixty degrees minus, respectively, relative to said second phase splitter, a capacitive reactance connected in the output of each of said phase splitters to be charged by the output voltages thereof, a saturable reactor and two paralleled discharge circuits connected in series across each of said three capacitive reactances, each of said discharge circuits including serially connected first and second primary windings of current transformers and including a pulse rectifier, the two pulse rectifiers connected to each of the capacitive reactances being connected in opposition relative thereto, each of said rectifiers having a grid and a cathode connected in a grid circuit, and two secondaries of said current transformers connected in parallel in each of said grid circuits to fire said rectifiers in sequence.

7. In a grid control system for a full wave rectifier system operable from a reference three phase voltage and having six mercury arc rectifiers, a voltage pulsing circuit including an adjustable phase shift circuit connected to a single phase of said reference voltage to control the phase of the output voltage thereof relative to said reference alternating current voltage, first, second, and third phase splitters connected to the output of said phase shift circuit, said first and third phase splitters shifting the phase by sixty degrees plus and sixty degrees minus, respectively, relative to said second phase splitter, adjustable means in two of said three phase splitters to trim the output phase voltage relative to the other one of said phase splitters, a capacitive reactance connected in the output of each of said phase splitters to be charged by the output voltages thereof, a saturable reactor connected in series with two paralleled discharged circuits connected across each of said three capacitive reactances, each of said discharge circuits including serially connected first and second primary windings of current transformers and including a pulse rectifier, the two pulse rectifiers connected to each of the capacitive reactances being connected in opposition relative thereto, each of said mercury arc rectifiers having a grid and a cathode, a grid biasing circuit for each of said six mercury arc rectifiers to bias said rectifier grids negative relative to said cathode, and two secondaries of said current transformers connected in parallel in each of said grid biasing circuits to fire said mercury arc rectifiers in sequence.

References Cited in the file of this patent

UNITED STATES PATENTS

| Re. 21,697 | Lord | Jan. 21, 1941 |
| 1,672,777 | Prince | June 5, 1928 |
| 1,948,360 | Sabbah | Feb. 20, 1934 |
| 2,015,538 | Silverman et al. | Sept. 24, 1935 |
| 2,130,890 | Mittag | Sept. 20, 1938 |
| 2,155,251 | Bedford | Apr. 18, 1939 |
| 2,262,482 | Alexanderson | Nov. 11, 1941 |
| 2,372,964 | Livingston | Apr. 3, 1945 |

FOREIGN PATENTS

| 495,565 | Great Britain | Nov. 14, 1938 |
| 670,533 | Germany | Jan. 20, 1939 |